(12) United States Patent
Ho et al.

(10) Patent No.: US 10,711,156 B2
(45) Date of Patent: Jul. 14, 2020

(54) POLYURETHANE COMPOSITIONS, FILMS, AND METHODS THEREOF

(71) Applicant: 3M INNOVATIVE PROPERTIES COMPANY, St. Paul, MN (US)

(72) Inventors: Charlie C. Ho, Woodbury, MN (US); Yongshang Lu, Woodbury, MN (US); Vijay Rajamani, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/370,427

(22) Filed: Mar. 29, 2019

(65) Prior Publication Data

US 2019/0225834 A1    Jul. 25, 2019

Related U.S. Application Data

(62) Division of application No. 15/126,323, filed as application No. PCT/US2015/021979 on Mar. 23, 2015, now Pat. No. 10,287,453.

(60) Provisional application No. 61/970,594, filed on Mar. 26, 2014.

(51) Int. Cl.
| | |
|---|---|
| *C09D 175/06* | (2006.01) |
| *C08G 18/73* | (2006.01) |
| *C09D 175/04* | (2006.01) |
| *C08G 18/28* | (2006.01) |
| *C08G 18/44* | (2006.01) |
| *C08J 7/04* | (2020.01) |
| *C08G 18/24* | (2006.01) |
| *C08G 18/61* | (2006.01) |

(52) U.S. Cl.
CPC ......... *C09D 175/06* (2013.01); *C08G 18/242* (2013.01); *C08G 18/289* (2013.01); *C08G 18/44* (2013.01); *C08G 18/61* (2013.01); *C08G 18/73* (2013.01); *C08J 7/0427* (2020.01); *C09D 175/04* (2013.01); *C08J 2327/06* (2013.01); *C08J 2375/04* (2013.01); *C08J 2475/06* (2013.01)

(58) Field of Classification Search
CPC .............................. C09D 175/04; C08G 77/16
See application file for complete search history.

(56) References Cited

U.S. PATENT DOCUMENTS

| | | | |
|---|---|---|---|
| RE24,906 E | 12/1960 | Ulrich | |
| 3,331,729 A | 7/1967 | Danielson | |
| 4,341,689 A * | 7/1982 | Doshi | C08G 18/20 523/211 |
| 4,418,120 A | 11/1983 | Kealy | |
| 4,619,867 A | 10/1986 | Charbonneau | |
| 4,686,137 A | 8/1987 | Ward, Jr. | |
| 4,835,217 A | 5/1989 | Jorgensen | |
| 5,691,439 A | 11/1997 | Slack | |
| 5,798,409 A | 8/1998 | Ho | |
| 5,952,444 A | 9/1999 | Ayama | |
| 6,258,918 B1 | 7/2001 | Ho | |
| 6,271,332 B1 | 8/2001 | Lohmann | |
| 6,313,254 B1 | 11/2001 | Meijs | |
| 6,383,644 B2 | 5/2002 | Fuchs | |
| 6,607,831 B2 | 8/2003 | Ho | |
| 6,624,277 B2 | 9/2003 | Yahkind | |
| 7,037,217 B2 | 5/2006 | Harris | |
| 7,122,599 B2 | 10/2006 | Haubennestel | |
| 7,732,055 B2 | 6/2010 | Niesten | |
| 8,242,189 B2 | 8/2012 | Rega | |
| 8,299,200 B2 | 10/2012 | Webster | |
| 2002/0018728 A1 | 2/2002 | Nacher | |
| 2002/0146568 A1 | 10/2002 | Ho | |
| 2007/0032626 A1 | 2/2007 | Roesler | |
| 2009/0017288 A1 | 1/2009 | Webster | |
| 2010/0280148 A1 * | 11/2010 | Webster | C08G 18/089 523/122 |
| 2015/0307740 A1 | 10/2015 | Havlin, Jr. | |

FOREIGN PATENT DOCUMENTS

| | | |
|---|---|---|
| CN | 102146259 | 10/2011 |
| GB | 7157725 A2 | 6/1995 |
| RU | 2339664 | 11/2008 |
| WO | WO 1987/00189 | 1/1987 |
| WO | WO 1989/001346 | 2/1989 |
| WO | WO 1993/24551 | 12/1993 |
| WO | WO 1994/13465 | 6/1994 |
| WO | WO 1994/13496 | 6/1994 |
| WO | WO 2002/081567 | 10/2002 |
| WO | WO 2009/025924 | 2/2009 |
| WO | WO 2013/184424 | 12/2013 |

OTHER PUBLICATIONS

International Search Report for PCT International Application No. PCT/US2015/021979, dated Jul. 10, 2015. 4 pgs.

* cited by examiner

*Primary Examiner* — Kuo Liang Peng

(74) *Attorney, Agent, or Firm* — Philip P. Soo

(57) ABSTRACT

Provided compositions, films, and methods impart a low-surface energy surface to a polyurethane layer whereby contaminants to bead up on the surface to dramatically facilitate removal. At the same time, the provided articles retain excellent clarity and processibility for use in surface protection applications. Compositions having these advantageous properties derive from reacting a primary polyisocyanate; a monohydroxyl polydimethylsiloxane present in a suitable amount; and a polyol selected from the group consisting of: a caprolactone polyol, polycarbonate polyol, a polyester polyol, acrylic polyol, polyether polyol, polyolefin polyol, and mixtures thereof.

19 Claims, 1 Drawing Sheet

POLYURETHANE COMPOSITIONS, FILMS, AND METHODS THEREOF

CROSS REFERENCE TO RELATED APPLICATIONS

This application is a divisional application of prior application Ser. No. 15/126,323, filed Sep. 15, 2016, now allowed, which national stage filing under 35 U.S.C. 371 of PCT/US2015/021979, filed Mar. 23, 2015, which claims the benefit of U.S. Provisional Application No. 61/970,594, filed Mar. 26, 2014, the disclosures of which are incorporated by reference in their entireties herein.

FIELD OF THE INVENTION

Provided are polyurethane compositions, derivative films, and related methods. More particularly, the provided polyurethane compositions are thermoset polyurethanes usable in protective film applications.

BACKGROUND

Polyurethanes are synthetic polymers of great commercial and industrial importance. Characterized by carbamate (—NH—CO—O—) chemical linkages, polyurethanes are commonly prepared by reacting a multifunctional isocyanate with a multifunctional diol or polyol in the presence of a catalyst. Thermoplastic polyurethanes are characterized by linear polymeric chains having self-ordering block structures, while thermoset polyurethanes are highly crosslinked by covalent bonds.

Depending on the diisocyanate and diol or polyol constituents used to make the polyurethane, these materials can be engineered to display a high degree of chemical resistance and a wide range of material properties. Generally, polyurethanes are extremely durable and flexible, making them desirable materials for many applications. Such applications include, for example, high-resilience foam seating, rigid foam insulation panels, microcellular foam seals and gaskets, hoses, elastomeric wheels and tires, automotive suspension bushings, electrical potting compounds, high performance adhesives, coatings and sealants, synthetic fibers, and carpet underlay.

Polyurethanes films and coatings can be especially advantageous in protecting substrates from environmental weathering, chemical exposure, heat, and/or abrasion. Polyurethane coatings and films can withstand harsh environments, making them suitable in outdoor applications.

International Publication No. WO 1994/013465 discloses a polyurethane-based protective layer for protecting an embossed multilayer film. This reference discloses that a surface layer containing the reaction product of an aliphatic diisocyanate and a polyester polyol, polycarbonate polyol or polyacrylic polyol can provide adequate protection in both indoor and outdoor applications. It is further disclosed that the polyurethane-based protective surface layer can be either crosslinked or uncrosslinked and can be solvent borne.

International Publication No. WO 1994/013496 discloses a multilayer graphic article having a substrate, one or more color layers disposed on the substrate, and a protective surface layer. The protective surface layer may comprise a polyurethane obtained from the reaction of an aromatic diisocyanate and a polyether polyol or a polyurethane obtained from the reaction of an aliphatic diisocyanate and a polyester polyol, polycarbonate polyol or polyacrylic polyol.

International Publication No. WO 1993/024551 discloses aqueous polyurethane dispersions including a dimer acid and low molecular weight cycloaliphatic components for coatings on various substrates. The coatings may be protective or decorative, and can provide desirable properties such as chemical resistance, water resistance, solvent resistance, toughness, abrasion resistance and durability.

We have previously publicly disclosed blackout film constructed with a polyurethane layer disposed on a black polyvinyl chloride film. The polyurethane layer was based on polyester and polyether polyols containing 6 wt % of an acrylic polydimethylsiloxane, and did not have sufficient optical properties for clear film and coating applications.

One technical problem with conventional polyurethane coatings relates to stain resistance. Even chemically-resistant polyurethanes can permanently stain when contaminants become adsorbed onto its surfaces, resulting in poor aesthetics. Such stain resistance can be enhanced by creating a low surface energy surface that induces contaminants to "bead" on the surface, thereby facilitating removal. Prior efforts to create a low energy surface focused on building polydimethylsiloxane into the polymer backbone using, for example, a dicarbinol polydimethylsiloxane or diamine polydimethylsiloxane. These compositions are disclosed in U.S. Pat. No. 5,691,439 (Slack et al.), U.S. Pat. No. 6,271,332 (Lohmann et al.), and U.S. Pat. No. 7,732,055 (Nesten et al.). Unfortunately, these approaches tended to provide porous structures with poor silicone presence at the film surface, which impaired resistance to moisture, chemicals, and staining.

SUMMARY

Crosslinked two-part polyurethane protective films created by the reaction of monohydroxyl polydimethylsiloxane, polyisocyanate, and polyol were discovered to provide surprisingly low surface energy and easy cleaning properties. In the polymerization of this polyurethane, the monohydroxyl silicone acts as a chain terminating agent that remains covalently bonded to the end of the polyisocyanate chains. The location of the silicone functional group enables the silicone to come to the surface of the film more easily. It was further discovered that the molecular architecture of the polyisocyanate also affects the surface energy of the resulting polyurethane film. Primary isocyanates, in particular, were found to facilitate migration of the silicone to the film surface, thus providing reduced surface energy compared with secondary isocyanates. These films can be made optically transparent and are well suited for clear coats and paint protection films.

In one aspect, a hardenable composition is provided. The hardenable composition comprises: a primary polyisocyanate; a monohydroxyl polydimethylsiloxane present in an amount ranging from 0.1 weight percent to 5.0 weight percent, relative to the overall weight of the hardenable composition; and a polyol selected from the group consisting of: a caprolactone polyol, polycarbonate polyol, a polyester polyol, acrylic polyol, polyether polyol, polyolefin polyol, and mixtures thereof.

In another aspect, a hardenable composition is provided, comprising: a primary polyisocyanate; a monohydroxyl polydimethylsiloxane; and a polyol selected from the group consisting of: a caprolactone polyol, polycarbonate polyol, acrylic polyol, polyolefin polyol, and mixtures thereof.

In still another aspect, a composite film is provided, comprising: a base layer; and a transparent clear coat layer extending across the base layer, the clear coat layer comprising: a primary polyisocyanate; a monohydroxyl polydimethylsiloxane; and a polyol selected from the group consisting of: caprolactone polyols, polycarbonate polyols, a polyester polyols, acrylic polyols, polyether polyols, polyolefin polyols, and mixtures thereof.

In yet another aspect, a method of making a stain-resistant composite film is provided. The method comprises: providing a clear coat layer by reacting together: a primary polyisocyanate; a monohydroxyl polydimethylsiloxane; and a polyol; coating the clear coat layer onto a base layer; and providing a free surface on the clear coat layer during the reaction for a time interval sufficient to allow polydimethylsiloxane functional groups to migrate to the free surface, thereby imparting stain-resistant properties to the composite film.

The provided compositions, films, and methods impart a low-surface energy surface to a polyurethane layer whereby contaminants to bead up on the surface to dramatically facilitate removal. At the same time, the provided articles retain excellent clarity and processibility for use in surface protection applications. The easy-cleaning properties of these materials make them well suited to protect painted vehicle surfaces that are regularly exposed to weather effects such as rain, snow, sleet, ice formation, and environmental contaminants such as dirt, grime, dust, air-borne pollutants, road surface residue, bird droppings, and so forth. Disposing a protective film over these surfaces can impart an aesthetic appearance to the vehicle and can sustain that appearance, even after repeated cleaning and washing cycles.

The above summary is not intended to describe each embodiment or every implementation of the reservoirs and associated vent assemblies described herein. Instead, a more complete understanding of the invention will become apparent and appreciated by reference to the following Detailed Description and Claims in view of the accompanying drawings.

DEFINITIONS

Figure 1:
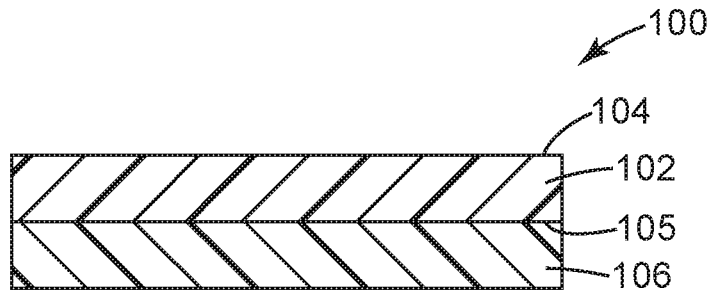
FIGS. 1-3 show cross-sectional elevational views of polyurethane composite films according to various embodiments.

As used herein:

"ambient conditions" means at a temperature of 25 degrees Celsius and a pressure of 1 atmosphere (approximately 100 kilopascals);

"catalyst" means a substance that can increase the speed of a chemical reaction;

"diol" means a compound having a hydroxyl functionality of exactly two;

"diisocyanate" means a compound having an isocyanate functionality of exactly two;

"harden" means to alter the physical state and or chemical state of the composition to make it transform from a fluid to less fluid state, to go from a tacky to a non-tacky state, to go from a soluble to insoluble state, to decrease the amount of polymerizable material by its consumption in a chemical reaction, or go from a material with a specific molecular weight to a higher molecular weight;

"hardenable" means capable of being hardened.

"polyisocyanate" means a compound having an isocyanate functionality of two or more;

"polyol" means a compound having a hydroxyl functionality of two or more; and

"primary isocyanate" means a carbon atom upon which the isocyanate group is attached also has two hydrogen atoms.

DETAILED DESCRIPTION

As used herein, the terms "preferred" and "preferably" refer to embodiments described herein that may afford certain benefits under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

Relative terms such as left, right, forward, rearward, top, bottom, side, upper, lower, horizontal, vertical, and the like may be used herein and, if so, are from the perspective observed in the particular figure. These terms are used only to simplify the description, however, and not to limit the scope of the invention in any way. Figures are not necessarily to scale.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Layer Constructions and Compositions

A composite film according to one embodiment is illustrated in FIG. 1 and designated by the numeral 100. The composite film 100 includes a clear coat layer 102 having a top surface 104 and a bottom surface 105. Extending along the bottom surface 105 of the clear coat layer 102 is a base layer 106 that contacts the clear coat layer 102 along essentially the entire bottom surface 105. Preferably, the clear coat layer 102 is laminated to the base layer 106.

While the base layer 106 is depicted here as a flat sheet, it may take on any of a number of different shapes. For example, the base layer 106 may have three-dimensional contours that include regions of positive and/or negative curvature. Exemplary base layers include sheets, decorative articles, graphics, and the like. Even if the base layer 106 is formed as a flat sheet, it can be subsequently die-cut, thermoformed, embossed, debossed, or otherwise formed into a shape different from its original shape. In some embodiments, the base layer 106 is any polymer capable of being stretched over a given substrate to be protected, such as an aliphatic thermoplastic polyurethane or polyvinylchloride. Optionally, a separate adhesive or mechanical device may be used to fasten the base layer 106 to the substrate.

The clear coat layer 102 is formed from a hardenable composition whose components react together to afford a hardened composition. In exemplary embodiments, the hardenable composition includes a polyol, a polyisocyanate, and a monohydroxyl acrylic polydimethylsiloxane. Hardening takes place through catalyzing the polymerization of the components of the hardenable composition into a crosslinked network.

The crosslink density of a polyurethane is calculated by dividing the weight of the reaction components having a functionality of three or greater by the total weight of the polyurethane and multiplying by 100. High crosslink densities, for example exceeding 30 percent, are generally associated with rigid polyurethane materials. Use of a primary aliphatic polyisocyanate, however, can enable polyurethanes that are both flexible and have a high crosslink density. When the polyisocyanate content of the second reaction component is about 50 weight percent or greater, crosslink densities can be at least 25 percent, at least 26 percent, at least 27 percent, at least 28 percent, at least 29 percent, at least 30 percent, at least 31 percent, at least 32 percent, at least 33 percent, at least 34 percent, at least 35 percent, at least 36 percent, at least 37 percent, at least 38 percent, at least 39 percent, or at least 40 percent.

In some embodiments, the clear coat layer 102 is made from a two-part hardenable composition, in which a first part and a second part are mixed together some time before hardening to produce the final polyurethane article. In one exemplary two-part composition, the first part includes the polyisocyanate, while the second part includes a mixture of the polyol, monohydroxyl polydimethylsiloxane, and a suitable catalyst. One or both of the first and second parts may be diluted in a suitable solvent or provided in solventless form. Preferably, both the first and second parts are liquids at ambient temperature and pressure.

Where used, a solvent can assist in adjusting the viscosities of the first and/or second part of the two-part hardenable composition. Such solvents include, for example, ether acetate, acetate, ketone, benzene derivatives, and mixtures thereof. There is no particular restriction on the amount of solvent used, although it is preferable that the amount is sufficient to facilitate adequate mixing of the first and second parts with each other while also capable of being evaporated prior to hardening the clear coat layer 102. Such evaporation could be facilitated by heat, vacuum, or both.

Various components of the hardenable composition comprising the clear coat layer 102 are further described below. It is to be understood that this description is not exhaustive and that additional components may optionally be included in the hardenable compositions described herein. It is further noted that the hardenable compositions need not be limited to the clear coat layer 102.

First, the provided hardenable polyurethane compositions include a polyol. In polyurethane synthesis, the hydroxyl (—OH) groups of the polyol react with the functional groups of the isocyanate component, generally in the presence of a suitable catalyst. Suitable polyols include polyester compositions, polyacrylic compositions, polyether compositions, polycarbonate compositions, polyalkylene compositions, caprolactone compositions, polyolefin compositions, and mixtures thereof. Particularly preferred polyols include caprolactone polyol, polycarbonate polyol, a polyester polyol, acrylic polyol, polyether polyol, polyolefin polyol, and mixtures thereof.

Typical molecular weights of polyols useful for the provided embodiments generally range from 28 to 6000 g/mol. Diols and polyols having molecular weights outside of the above range, however, may also be usable in these hardenable compositions.

Suitable polyols are commercially available from various sources. Polyols are available from Bayer Corporation of Pittsburgh, Pa. under the trade name DESMOPHEN and MULTRANOL, Crompton Corporation of Greenwich, Conn. under the trade name FORMREZ, BASF Corporation of Ludwigshafen, Germany under the trade name JONCRYL or PLURACOL, Dow Chemical Company of Midland, Mich. under the trade name ACRYLOID, Perstorp of Perstorp, Sweden under the trade name CAPA, Kuraray Company, Ltd. of Tokyo, Japan, Dupont Company of Wilmington, Del. under the trade name TERATHANE, COIM USA Inc, West Deptford, N.J. under the trade name DIEXTER, King Industries Specialty Chemicals of Norwalk, Conn. under the trade name K-FLEX, Cray Valley USA of Exton, Pa. under the trade names POLY BD and KRASOL, and Stepen Company of Northfield, Ill. under the trade name STEPANOL, and Hall Star Company of Chicago, Ill., under the trade name URETHHALL.

Second, the provided hardenable compositions include a suitable polyisocyanate, characterized by two or more isocyanate functional groups having the chemical formula —N=C=O. The polyisocyanate may be aliphatic or aromatic, and further may be primary, secondary, tertiary, or a mixture thereof. In preferred embodiments, however, the polyisocyanate component is a primary polyisocyanate. It was discovered that the molecular structure of a primary polyisocyanate substantially enhances the ability of silicone functional groups to migrate to the free surface of the composition. Facile migration of these functional groups, in turn, decreases the surface energy of the hardened composition, creating an easy cleaning surface that tends to repel contaminants.

Secondary polyisocyanates and polyisocyanates with higher functionality did not display the beneficial properties observed with primary polyisocyanates. Without wishing to be bound by theory, it is assumed that higher order polyisocyanates may be affected by substantial steric or chain/ring strain effects that retard mobility of the silicone groups even when these groups are disposed at the ends of the polymer chains.

Primary polyisocyanates can be made from primary diisocyanates. Particularly suited primary diisocyanates for synthesizing primary polyisocyanates include, but are not limited to, 1,6-hexamethylene diisocyanate, trimethyl-hexamethylene diisocyanate, 1,4-tetramethylene diisoycanate, 1,3-xylene diisocyanate, 1,4-xylene diisocyanate, 1,12-dodecamethylene diisocyanate, 2-methylpentamethylene diisocyanate, or 1,4-cyclohexane dimethylene diisocyanate.

The polyisocyanate selected often affects the durability of the resulting polyurethane. For articles which require outdoor weatherability, aliphatic polyisocyanates are generally preferred. For a flexible sheet material to be used for vacuum thermoforming into three dimensional articles, a suitable primary polyisocyanate could be, for example, a biuret or an isocyanurate.

Third, the provided hardenable compositions include a monofunctional silicone component, such as a monohydroxyl polydimethylsiloxane. In a preferred embodiment, the polydimethylsiloxane is an acrylic polydimethylsiloxane, in which the polydimethylsiloxane is a side chain branching from an acrylic backbone. Because this silicone component has a functionality of one, it acts as a chain terminating agent during polymerization of the clear coat composition.

The amount of monohydroxyl acrylic polydimethylsiloxane was found to have bearing on certain properties of the clear coat, such as clarity, UV light resistance and heat aging performance. As later reported in the Examples, adding over 5 weight percent monohydroxyl acrylic polydimethylsiloxane relative to the overall weight of the hardenable composition yielded films having degrees of haze unacceptable for clear coat applications.

Preferably, the amount of monohydroxyl acrylic polydimethylsiloxane is sufficient to impart acceptable low surface energy and easy cleaning properties to the resulting clear coat layer 102 without unduly compromising its optical properties. In exemplary embodiments, the monohydroxyl acrylic polydimethylsiloxane is present in an amount of at least 0.1 weight percent, at least 0.3 weight percent, or at least 0.5 weight percent, based on the overall weight of the hardenable composition. Preferably, the monohydroxyl acrylic polydimethylsiloxane is present in an amount of at most 6 weight percent, at most 5 weight percent, or at most 4 weight percent, based on the overall weight of the hardenable composition. It is believed that the concentration of the polydimethylsiloxane functional groups is greater at the surface of the clear coat layer 102 than in the bulk of the clear coat layer 102, thereby providing the enhanced "dry erase" cleaning properties observed.

In some embodiments, the hardenable composition contains monohydroxyl acrylic polydimethylsiloxane present in an amount ranging from 0.1 weight percent, and in increments of 0.1 weight percent (i.e., 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0), up to and including 5.0 weight percent, and any range therebetween (e.g., 0.5 to 5.0 weight percent, 0.5 to 4.5 weight percent, 0.7 to 4.8 weight percent, etc.), relative to the overall weight of the hardenable composition.

The hardenable composition preferably includes a catalyst in combination with the polyol and the isocyanate components in order to facilitate reaction between the components. Conventional catalysts generally recognized for use in the polymerization of polyurethanes can be suitable for use with the present invention. For example, aluminum, bismuth, tin, vanadium, zinc, zirconium based catalysts, amine catalysts, or mixtures thereof may be used. Although less preferred, mercury based catalysts may also be used. Preferred catalysts include tin based catalysts, such as dibutyl tin compounds. Particularly preferred are catalysts selected from the group consisting of dibutyltin diacetate, dibutyltin dilaurate, dibutyltin diacetylacetonate, dibutyltin dimercaptide, dibutyltin dioctoate, dibutyltin dimaleate, dibutyltin acetonylacetonate, and dibutyltin oxide. The catalyst is preferably included at levels of at least 10 parts per million parts (ppm) based on the total solution weight in the first component, and more preferably at least 25 ppm or greater.

The hardenable composition may include other additives conventionally used in protective polymeric coatings. These additives may include, for example, an anti-oxidant or an UV radiation stabilizer. The hardenable composition can also be pigmented if a tinting of the clear coat layer 102 is desired. Although inorganic or organic pigments can degrade the optical and mechanical properties of the polyurethane layer, small amounts can be added to the polyurethane while still achieving acceptable weatherability, chemical, and heat resistance as well as a good abrasion and scratch resistance.

Particularly preferred coloring agents are pigments and dyes. Dyes and pigments suitable for the addition to the polyurethane layer may be in the form of a paste. Commercially available pigments that can be used in the polyurethane layer of this invention include pigments available from ISL Chemie GmbH of Kürten, Germany under the trade name ISOVERSAL and BASF of Ludwigshafen, Germany under the trade name LUCONYL. Typically, dye colorants can be added to the polyurethane layer in an amount of 0.5 pph (parts per hundred) up to 10 pph without unacceptably compromising the beneficial properties of the polyurethane.

Referring again to FIG. 1, the base layer 106 essentially serves as a backing for the clear coat layer 102. The base layer 106 can be obtained by hardening two-part hardenable compositions as described above for the clear coat layer 102 or from any other synthetic method. The synthesis and polymer processing of the base layer 106 can be conducted jointly or in discrete steps.

In exemplary embodiments, the base layer 106 is made from a polyurethane, polyester and/or polyolefin such polypropylene, polyethylene and blends of polyethylene and polypropylene, ethylene modified copolymers such as ethylene-vinylacetate, ethylene-(meth)acrylic acid, ethylene-methacrylate and blends thereof. Compositions yielding particularly desirable properties in a composite film for protecting the exterior surface of an automobile include ionomers of olefin/vinyl carboxylate copolymers such as ethylene-acrylic acid and ethylene-methacrylic acid copolymers combined with various metal cations including cations of lithium, sodium, potassium, zinc, aluminum and calcium. Suitable commercial ionomer resins include materials available from E.I. DuPont de Nemours & Co. of Wilmington, Del. under the trade name SURLYN.

In a preferred embodiment, the base layer 106 is an aliphatic thermoplastic polyurethane, which can provide excellent optical characteristics, high flexibility, good heat and UV resistance, and good gravel resistance (or chip resistance).

Any of a number of known conventional coating techniques may be used to coat the hardenable coating composition on the base layer 106. Examples of useful coating techniques include Meyer bar coating, spray coating, screen printing, rotary screen coating, as well as direct gravure coating, reverse gravure coating, die coating and offset gravure coating. Optionally, these techniques may be used in coating any of the other composite film layers herein disclosed.

Figure 2:
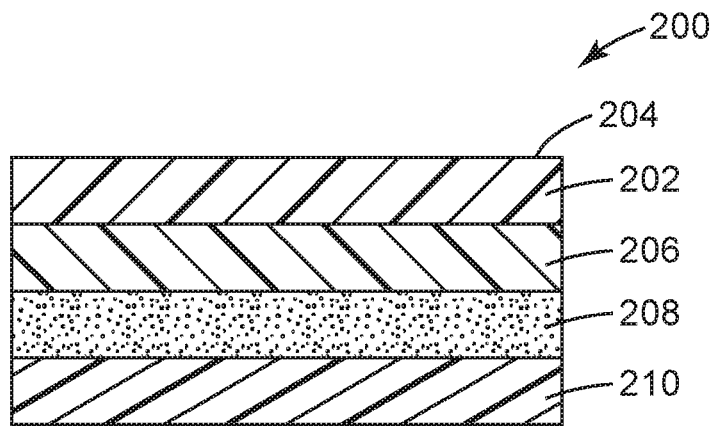

FIG. 2 shows a composite film 200 according to a second embodiment having a clear coat layer 202 and base layer 206 that are essentially analogous to those of FIG. 1 and further including an adhesive layer 208 and adhesive liner 210. As shown, the adhesive layer 208 extends across and contacts a major surface of the base layer 206 opposite the side contacting the clear coat layer 202. Therefore, in this construction, the base layer 206 is interposed between the clear coat layer 202 and the adhesive layer 208. On the bottom surface of the composite film 200, the adhesive layer 208 is protected by the release liner 210, which extends across and contacts the adhesive layer 208, which is thus interposed between the base layer 206 and the release liner 210.

Optionally, the release liner 210 functions as a carrier film that is discarded when the composite film 200 is used. For example, in a typical end user application of the composite film 200, the release liner 210 can be peeled away from the adhesive layer 208, and then the clear coat layer 202, base layer 206, and adhesive layer 208 collectively spread over and pressed down against the substrate to be protected.

Although not illustrated here, the release liner 210 may be omitted from the construction shown in FIG. 2. If so, the composite film 200 could be rolled upon itself for storage whereby the clear coat layer 202 itself protects the adhesive layer 208 while also functioning as a release liner. In this embodiment, the adhesion between the adhesive layer 208 and clear coat layer 202 can be tailored to be sufficiently to hold the roll together and yet allow the composite film 200 to be easily dispensed by unwinding the roll.

In a preferred embodiment, the adhesive layer 208 is a pressure sensitive adhesive that is normally tacky at ambient conditions. Suitable pressure sensitive adhesives can be based on polyacrylates, synthetic and natural rubbers, polybutadiene and copolymers or polyisoprenes and copolymers. Silicone based adhesives such as polydimethylsiloxane and polymethylphenylsiloxane may also be used. Particularly preferred pressure sensitive adhesives include polyacrylate-based adhesives, which can display advantageous properties as high degrees of clarity, UV-stability and aging resistance. Polyacrylate adhesives that are suitable for protective film applications are described, for example, in U.S. Pat. No. 4,418,120 (Kealy et al.); U.S. Pat. No. RE24,906 (Ulrich); U.S. Pat. No. 4,619,867 (Charbonneau et al.); U.S. Pat. No. 4,835,217 (Haskett et al.); and International Publication No. WO 87/00189 (Bonk et al.).

Preferably, the polyacrylate pressure sensitive adhesive comprises a crosslinkable copolymer of a C4-C12 alkylacrylate and an acrylic acid. The adhesive can be used with or without a crosslinker. Useful crosslinking reactions include chemical crosslinking and ionic crosslinking. The chemical crosslinker could include polyaziridine and/or bisamide and the ionic crosslinker may include metal ions of aluminum, zinc, zirconium, or a mixture thereof. A mixture of chemical crosslinker and ionic crosslinker can also be used. In some embodiments, the polyacrylate pressure sensitive adhesive includes a tackifier such as rosin ester. Adhesives useful in the invention may also contain additives such as ground glass, titanium dioxide, silica, glass beads, waxes, tackifiers, low molecular weight thermoplastics, oligomeric species, plasticizers, pigments, metallic flakes and metallic powders as long as they are provided in an amount that does not unduly degrade the quality of the adhesive bond to the surface.

As an alternative to pressure sensitive adhesives, the adhesive layer 208 may include a hot melt adhesive, which is not tacky at room temperature but becomes tacky upon heating. Such adhesives include acrylics, ethylene vinyl acetate, and polyurethane materials.

Generally, the adhesive layer 208 is provided at a thickness ranging from 25 to 560 micrometers. For certain applications, such as applying the composite film 200 to an automotive exterior, it may be desirable for the adhesive to be repositionable, at least initially, so that the sheet can be adjusted to fit at a desired place before a permanent bond is formed. Such repositionability may be achieved by providing, for example, a layer of minute glass bubbles on the adhesive surface as disclosed in U.S. Pat. No. 3,331,729 (Danielson et al.).

Figure 3:
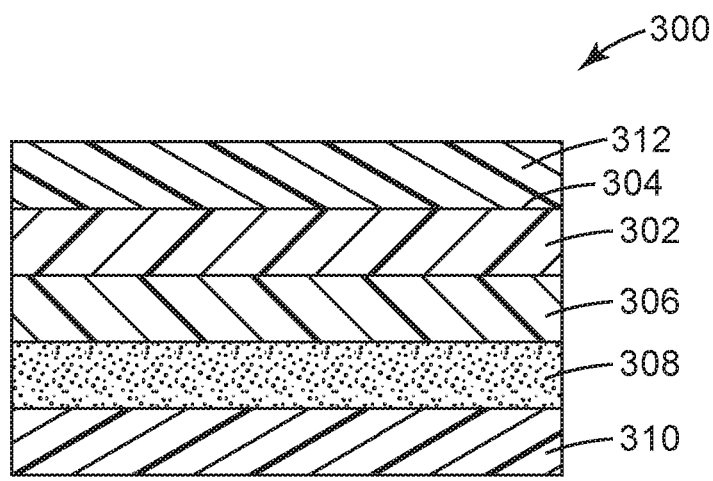

FIG. 3 shows a composite film 300 according to still another embodiment that shares many aspects of the composite films 100, 200 described above. Like the aforementioned composite films, the composite film 300 includes a clear coat layer 302, base layer 306, along with optional adhesive layer 308 and release liner 310. The composite film 300 further includes, however, a clear coat liner 312 that extends over and contacts a top surface 304 of the clear coat layer 302 such that the clear coat layer 302 is interposed between the clear coat liner 312 and the base layer 306.

The clear coat liner 312, which may also act as a carrier film for the composite film 300, protects the outward-facing surface of the clear coat layer 302 during the manufacture, packaging, storage, and dispensing of the composite film 300. The clear coat liner 312 is typically laminated to the top surface 304 of the clear coat layer 302 and then stripped off after the clear coat layer 302 is essentially fully cured. In some applications, the clear coat liner 312 can remain in contact with the clear coat layer 302 until the protected article is ready to be transferred to the end user. In another application, the clear coat liner 312 may be stripped off of the clear coat layer 302 prior to a forming process such as vacuum thermoforming.

There are no particular restrictions on the material used for the clear coat liner 312, although it is preferable that the clear coat liner 312 does not readily slide along the clear coat layer 302 and yet easily peels away from the clear coat layer 302. Exemplary materials usable for clear coat liner 312 include polyethylene terephthalate, polyolefin, modified polyolefin, and mixtures thereof.

In typical embodiments, the top surface 304 of the clear coat layer 302 is smooth, resulting in a glossy appearance. In certain applications, it may be desired for the composite film 300 to have a matte finish. This can be achieved by providing a clear coat liner 312 that has a roughened texture, which is pressed against the clear coat layer 302 to replicate the texture before it is fully hardened. The clear coat liner 312 can then be subsequently peeled away to produce a clear coat layer 302 having a roughened surface with reduced gloss.

With respect to any of the composite films 100, 200, 300, one or more additional layers may be coated or laminated to either major surface of the composite film 100, 200, 300 or, alternatively, interposed between any two adjacent layers present in the composite film 100, 200, 300. Such layer or layers may be similar to those already described or may be structurally or chemically distinct. Distinct layers could include, for example, extruded sheets, metal vapor coatings, printed graphics, particles, and primers, and may be continuous or discontinuous. For example, an additional tie layer may be disposed between the base layer 206, 306 and the adhesive layer 208, 308 to improve the quality of adhesion between the adhesive and base layers.

If desired, the base layer 106 of the composite film 100 could be laminated onto a substrate, such as a vehicular body panel. Alternatively, the base layer 106 could be provided in a configuration where it is already adhered or otherwise coupled to the substrate.

One or more additional layers could be permanently or temporarily disposed on the top surface 104, 204, 304 of the clear coat layer 102, 202, 302. For instance, the clear coat layer may itself comprise multiple clear coat layers. Like the clear coat layer 102, 202, 302, any of the other layers described herein could be pigmented to alter the outward appearance of the composite film.

Other features, options and advantages related to the composite films 100, 200, 300 are further described in U.S. Pat. No. 6,607,831 (Ho et al.) and U.S. Pat. No. 6,383,644 (Fuchs).

Methods of Making

The manufacture of the composite films 100, 200, 300 involves forming two or more layers, as described, that are subsequently coupled to each other. The layers constituting the composite films 100, 200, 300 may be prepared in parallel or in series.

The clear coat layer in particular may be formed using conventional techniques known to those of ordinary skill in the art. Such techniques include, for example, coating or extruding onto a substrate. One of skill in the art can coat or extrude the disclosed hardenable clear coat compositions onto a substrate using batch or continuous techniques.

In an exemplary method, prior to coating or extrusion onto a web, the first part of a two-part hardenable composition for the clear coat layer is prepared by first mixing the polyol components with the monohydroxyl acrylic polydimethylsiloxane, a suitable solvent (if needed), and any optional additives. The second part of the two-part hardenable composition contains the isocyanate component along with any solvent or optional additives. The first and second parts are then mixed in appropriate amounts to obtain a desired NCO:OH ratio. The NCO:OH ratio is preferably selected between 0.75 and 1.25. The composition is then coated onto a suitable substrate.

In some embodiments, the mixture of the polyol component and isocyanate component is coated onto a substrate, such as a polyurethane base layer, using conventional equipment such as a knife coater, roll coater, reverse roll coater, notched bar coater, curtain coater, rotogravure coater, or rotary printer. Coatings can be hand spread or automated and may be carried out according to either a batch or continuous process. The viscosity of the composition can be adjusted as needed to suit the type of coater used.

The coated hardenable composition is then dried and, in one embodiment, partially hardened at elevated temperatures. An increasing temperature profile is preferably used to first evaporate the solvent and then partially cure the composition. Where a continuous process is used, these processes can be occur along a moving web. A 0.0076 centimeter (0.003 inch) thick wet coating having a solids content of about 45%, for example, could use a temperature profile of 2 minutes at 80° C. followed by 10 minutes at 125° C. In general, the coating compositions are preferably dried and/or hardened in a temperature range from 25° C. to 150° C.

The processing of the clear coat layer during its drying and hardening steps can have a substantial effect on its surface properties.

One consideration in particular relates to the presence of a free surface on the clear coat layer. It is believed, for example, that providing a free surface on the clear coat layer during the hardening reaction induces polydimethylsiloxane functional groups to migrate or reorient at the free surface, thereby imparting the observed stain-resistant properties to the composite film. Surprisingly, disposing a clear coat liner (such as clear coat liner 312 in FIG. 3) onto the clear coat layer was observed to significantly impair the functionalization of the free surface. It is therefore preferable that a sufficient time interval elapses between the coating the clear coat layer and lamination of the clear coat liner onto the clear coat layer, to allow polydimethylsiloxane functional groups to migrate appreciably to the free surface.

On information and belief, the sufficiency of the time interval between forming the clear coat layer having the free surface and laminating, or otherwise disposing, the clear coat liner onto the free surface results in a substantial concentration gradient of polydimethylsiloxane functional groups near the top surface of the clear coat layer. Such a concentration gradient is defined along the thickness dimension of the composite film and can be observed as a difference in the concentration of polydimethylsiloxane functional groups between locations at the top surface of the composite film and locations remote from the top surface of the composite film where no free surface was present when hardening the clear coat layer.

The thickness of the polyurethane layer can vary as needed for the end use. Typically, the film thickness after hardening is at least 0.05 millimeters, at least 0.075 millimeters, or at least 0.1 millimeters. In some embodiments, the film thickness after hardening is at most 1.27 millimeters, at most 1.1 millimeters, or at most 1.0 millimeters.

Applications and Properties

The provided articles can be applied to any of a wide variety of substrates. Such substrates may be flat like the composite films 100, 200, 300 in FIGS. 1-3, or may have a contour with a compound curvature in three dimensions. When it is desired to adhere these articles to such curved surfaces, it is preferable that the composite film has sufficient flexibility to conform to the surface of the substrate without delaminating at the edges or substantially wrinkling.

Common substrates that may be suitable for protection include, for example, bumper facia, pillar posts, rocker panels, wheel covers, door panels, trunk and hood lids, mirror housings, dashboards, floor mats, and door sills. In an exemplary method of application, a composite film can be mounted to a suitable substrate by simultaneously peeling away the release liner from the adhesive layer while applying the film onto the substrate in a single continuous motion.

In some embodiments, the provided composite film 100, 200, 300 is applied to the exterior surfaces of automobiles, trucks, motorcycles, trains, airplanes, marine vehicles, and snowmobiles. In alternative embodiments, the composite films can be applied to surfaces of structures other than vehicles, such as fixtures, buildings and architectural surfaces. Applications of these films may be either primarily indoor or outdoor in nature. The provided composite films 100, 200, 300 are especially advantageous outdoors not only because of their low surface energy and easy cleaning properties, but because they display excellent weathering, chemical and abrasion resistance while remaining highly flexible.

In some embodiments, the composite film 100, 200, 300 has an exposed top surface. Advantageously, the clear coat layer 102 provides a combination of desirable optical and mechanical properties rendering it especially suitable as an outermost layer in protective film applications.

The optical properties of a clear coat layer or composite film can be characterized by its measured light transmission and haze values. It is generally desirable to have the lowest haze possible for clear coat applications. Transmission and haze values for clear coat layer samples can be obtained, for example, using a Haze-Gard Plus instrument available from BYK Gardner USA of Columbia, Md. The hardened clear coat layer or composite film preferably displays a haze that is less than 6 percent, less than 5 percent, less than 4 percent, less than 3.5 percent, or less than 3 percent, as measured according to the Haze Test as later described in the Examples section.

The hardened clear coat layer 102 also exhibits a stain-resistant, low surface energy surface that tends to repel liquid contaminants, causing them to "bead up" when disposed on the clear coat surface. Since these contaminants do not wet the clear coat surface, cleaning of the protective film is greatly facilitated. The surface energy of the clear coat layer 102 can be experimentally characterized using contact angle measurements. In some embodiments, the hardened composition displays an advancing water contact angle at ambient temperature and pressure that is at least 97 degrees, at least 99 degrees, at least 101 degrees, at least 102 degrees, or at least 103 degrees. In some embodiments, the advancing water contact angle is at most 125 degrees, at most 122 degrees, at most 119 degrees, at most 117 degrees, or at most 116 degrees.

In some embodiments, the hardened composition displays an advancing water contact angle at ambient temperature and pressure ranging from 97 degrees, and in increments of 1 degree up to and including 125 degrees, and any range therebetween (e.g. 100 degrees to 115 degrees).

While not intended to be limiting on the present invention, particular exemplary embodiments A-AM are contemplated and described as follows:

A. A hardenable composition including: a primary polyisocyanate; a monohydroxyl polydimethylsiloxane present in an amount ranging from 0.1 weight percent to 5.0 weight percent, relative to the overall weight of the hardenable composition; and a polyol selected from the group consisting of: a caprolactone polyol, polycarbonate polyol, a polyester polyol, acrylic polyol, polyether polyol, polyolefin polyol, and mixtures thereof.

B. A hardenable composition including: a primary polyisocyanate; a monohydroxyl polydimethylsiloxane; and a polyol selected from the group consisting of: a caprolactone polyol, polycarbonate polyol, acrylic polyol, polyolefin polyol, and mixtures thereof.

C. The hardenable composition of embodiment B, where the monohydroxyl polydimethylsiloxane is present in an amount ranging from 0.1 weight percent to 5.0 weight percent, relative to the overall weight of the hardenable composition.

D. The hardenable composition of embodiment A or C, where the monohydroxyl polydimethylsiloxane is present in an amount ranging from 0.1 weight percent to 4.0 weight percent, relative to the overall weight of the hardenable composition.

E. The hardenable composition of embodiment D, where the monohydroxyl polydimethylsiloxane is present in an amount ranging from 1.0 weight percent to 4.0 weight percent, relative to the overall weight of the hardenable composition.

F. The hardenable composition of any one of embodiments A-E, where the hardenable composition has a stoichiometric ratio of isocyanate to hydroxyl groups ranging from 0.75:1 to 1.25:1.

G. The hardenable composition of any one of embodiments A-F, where the hardenable composition is a two-part hardenable composition including: a first part including the polyisocyanate and a second part including a mixture of the polyol and the monohydroxyl polydimethylsiloxane.

H. The hardenable composition of embodiment G, where either or both of the first and second parts further includes a solvent selected from the group consisting of: ether acetate, acetate, ketone, benzene derivatives, and mixtures thereof.

I. The hardenable composition of embodiment G or H, where the first part further includes a catalyst.

J. The hardenable composition of embodiment I, where the catalyst is selected from a tin catalyst, zinc catalyst, bismuth catalyst, zirconium catalyst, aluminum catalyst, amine catalyst, and mixtures thereof.

K. The hardenable composition of any one of embodiment A-J, where the polyisocyanate is an aliphatic polyisocyanate.

L. A hardened composition obtained by reacting together components of the hardenable composition of any one of embodiments A-K.

M. The hardened composition of embodiment L, where the hardened composition is substantially transparent.

N. The hardened composition of embodiment L or M, where the hardened composition displays a haze of less than 7 percent as measured according to the Haze Test.

O. The hardened composition of embodiment N, where the hardened composition displays a haze of less than 5 percent as measured according to the Haze Test.

P. The hardened composition of embodiment O, where the hardened composition displays a haze of less than 4 percent as measured according to the Haze Test.

Q. The hardened composition of any one of embodiments L-P, where the hardened composition displays an advancing water contact angle at ambient temperature and pressure ranging from 95 degrees to 112 degrees.

R. The hardened composition of embodiment Q, where the hardened composition displays an advancing water contact angle at ambient temperature and pressure ranging from 97 degrees to 112 degrees.

S. The hardened composition of embodiment R, where the hardened composition displays an advancing water contact angle at ambient temperature and pressure ranging from 99 degrees to 112 degrees.

T. The hardened composition of any one of embodiments L-S, where the hardened composition has a crosslink density of at least 25 percent.

U. The hardened composition of embodiment T, where the hardened composition has a crosslink density of at least 30 percent.

V. The hardened composition of embodiment U, where the hardened composition has a crosslink density of at least 40 percent.

W. An article including a substrate coated with the hardened composition of any one of embodiments L-V.

X. A composite film including: a base layer; and a transparent clear coat layer extending across the base layer, the clear coat layer including: a primary polyisocyanate; a monohydroxyl polydimethylsiloxane; and a polyol selected from the group consisting of: caprolactone polyols, polycarbonate polyols, a polyester polyols, acrylic polyols, polyether polyols, polyolefin polyols, and mixtures thereof.

Y. The composite film of embodiment X, where the base layer includes an aliphatic thermoplastic urethane.

Z. The composite film of embodiment X, where the base layer includes polyvinylchloride.

AA. The composite film of any one of embodiments X-Z, where clear coat layer has an exposed top surface and a bottom surface contacting the base layer.

AB. The composite film of any one of embodiments X-AA, further including an adhesive layer extending across and contacting the base layer, where the base layer is interposed between the clear coat layer and the adhesive layer.

AC. The composite film of embodiment AB, where the adhesive layer includes a pressure sensitive adhesive.

AD. The composite film of embodiment AB, where the adhesive layer includes a hot melt adhesive.

AE. The composite film of any one of embodiments X-AD, where monohydroxyl polydimethylsiloxane is a monohydroxyl acrylic polydimethylsiloxane.

AF. The composite film of any one of embodiments AB-AE, further including a release liner extending across and contacting the adhesive layer, where the adhesive layer is interposed between the base layer and the release liner.

AG. The composite film of any one of embodiments X-AF, further including a clear coat liner extending across and contacting the clear coat layer, where the clear coat layer is interposed between the base layer and the clear coat liner.

AH. The composite film of any one of embodiments X-AG, where every layer in the composite film is transparent.

AI. A method of making a stain-resistant composite film including: providing a clear coat layer by reacting together: a primary polyisocyanate; a monohydroxyl polydimethylsiloxane; and a polyol; coating the clear coat layer onto a base layer; and providing a free surface on the clear coat layer during the reaction for a time interval sufficient to allow polydimethylsiloxane functional groups to migrate to the free surface, thereby imparting stain-resistant properties to the composite film.

AJ. The method of embodiment AI, where the polyol is selected from the group consisting of: caprolactone polyols, polycarbonate polyols, a polyester polyols, acrylic polyols, polyether polyols, polyolefin polyols, and mixtures thereof.

AK. The method of embodiment AI or AJ, further including laminating a clear coat liner to the top surface of the clear coat layer.

AL. The method of embodiment AK, where the clear coat liner includes a polymer selected from the group consisting of: polyethylene teraphthalate, polyolefin, and modified polyolefin.

AM. The method of embodiment AK or AL, where the clear coat liner has a roughened surface texture to reduce gloss of the composite film when the clear coat liner is peeled away from the clear coat layer.

Test Methods

Ink Marker and Dry Erase

The composite films were tested for stain resistance by applying the films to a white painted panel to simulate a protective film covering an automotive metal panel. The films were applied with an application fluid consisting of a mixture of water and isopropyl alcohol (75:25) at an application pressure of 30 PSI. Three lines were drawn on the composite films using a black SHARPIE permanent ink marking pen. After 3 minutes, the films were evaluated for their ability to wet out the ink. A paper towel was used to attempt to erase the drawn lines with moderate hand pressure.

Contact Angle

The advancing and receding water contact angles were measured for the clear coat using the procedure described in the technical manual of Drop Shape Analysis System DSA-100 (Kruss, Hamburg, Germany). The measurement system was equipped with a digital camera, automatic liquid dispensers, and sample stages allowing for a hands-free contact angle measurement via automated placement of a drop of water (where the water drop has a size of approximately 5 microliters). The drop shape was captured automatically and then analyzed via Drop Shape Analysis by a computer to determine the advancing, and receding water contact angle.

Haze

The composite films were applied onto a transparent 100 micron (0.004 in) polyethylene-terephthalate film with an application fluid consisting of a mixture of water and isopropyl alcohol (75:25) at an application pressure of 30 PSI. The haze values were measured using a Haze-Gard Plus obtained from Byk Gardner USA (Columbia, Md.).

Stain Resistance

The Stain Resistance of the composite films were measured according to the color change before and after application of various liquids to the clear coat layer. The composite films were applied to a white painted panel with an application fluid consisting of a mixture of water and isopropyl alcohol (75:25) at an application pressure of 207 KPa (30 PSI). The color change was measured before and after application of various staining liquids to the clear coat layer using a CS-5 Chroma Sensor from Datacolor International (Lawrenceville, N.J.). The stain fluids were applied onto the clear coat layers in an approximately 25 micron (1 inch) diameter spot. After 24 hours at room temperature, the stain fluids were cleaned with varnish makers and painters naphtha (VM&P). $\Delta E$, $\Delta L$, $\Delta a$, $\Delta b$ were measured for each sample. Details of the staining fluids are reported in Table 1 below. Test results are reported in Table 2 below.

EXAMPLES

TABLE 1

| Materials used | | |
| --- | --- | --- |
| Designation | Description | Supplier |
| 1,4-butanediol | Chain extender | Arco Chemical, Newtown Square, PA |
| C-1090 | Polycarbonate polyol | Kuraray America, Houston, TX |
| CAB 381-01 | Cellulose acetate butyrate leveling agent | Eastman Chemical, Kingsport, TN |
| CAPA 3031 | Caprolactone polyol | Solvay S.A., Brussels, Belgium |
| DBTDL | Dibutyl tin dylaurate catalyst | Air Products and Chemicals, Inc., Allentown, PA |
| DESMODUR N3390 | Aliphatic primary polyisocyanate | Bayer Corp., Whippany, NJ |
| DESMODUR Z4470 | Aliphatic secondary polyisocyanate | Bayer Corp., Whippany, NJ |
| FOMREZ 44-111 | Polyester polyol | Chemtura Corp., Middlebury, CT |
| FOMREZ 55-112 | Polyester polyol | Chemtura Corp, Middlebury, CT |
| FOMREZ 55-225 | Polyester polyol | Chemtura Corp., Middlebury, CT |
| H12MDI | Aliphatic secondary diisocyanate | Bayer Corp., Whippany, NJ |
| Polyurethane clear coat | Polyurethane composition | Composition C in Table 2 of U.S. Pat. No. 6,607,831 |

TABLE 1-continued

Materials used

| Designation | Description | Supplier |
| --- | --- | --- |
| MCR-C12 | Monocabinol terminated polydimethylsiloxane (Mw: 1000) | Gelest Inc., Morrisville, PA |
| SPF6 | Polyurethane based clear paint protection film | 3M Company, St. Paul, MN |
| TEGO 5000 | Hydroxyl functional polydimethylsiloxane | Evonik Industries, Essen, Germany |
| TEGO 5001 | Mono-hydrolacrylic polydimethylsiloxane | Evonik Industries, Essen, Germany |
| TINUVIN-292 | Hindered amine | BASF SE, Ludwigshafen, Germany |
| TINUVIN-571 | UV light absorber | BASF SE, Ludwigshafen, Germany |
| TINUVIN-405 | UV light absorber | BASF SE, Ludwigshafen, Germany |
| TOLONATE HDT-LV | Aliphatic primary polyisocyanate | Vencorex Chemicals, Freeport, TX |
| Bitumen | 10% bitumen in diesel fuel | |
| ATF1 | Toyota ATF type T-IV Automatic transmission fluid | Toyota Motor Sales, USA, Torrance, CA |
| Road Tar | 10% road tar in diesel fuel | 3M Company, St. Paul, MN |
| ATF2 | DEXRON III/MECRON Automatic transmission fluid | Ashland Inc., Covington, KY |

Example 1

A two-component polyurethane composition was prepared by mixing 15.8 grams of C-1090 polyol, 4.0 grams of CAPA 3031 polyol, 0.3 grams of MCR-C12, and 0.01 grams of DBTDL, with 51.8 grams of diacetone alcohol in a round bottom flask and agitated for 5 minutes to produce the first reaction component.

The second reaction component consisted of 8.69 grams of TOLONATE HDT-LV in 63.2 grams of diacetone alcohol. The first and second reaction components were mixed in a one to one volume ratio at room temperature under agitation for 5 minutes and then poured onto SPF6 substrate and drawn done by hand with a conventional #12 Mayer bar to produce a coating of approximately 30 microns (0.0012 in) in thickness. The coated film was cured for 1 hour at 120° C. in a convection oven. The resulting coating exhibited excellent bead up of the SHARPIE marker ink and excellent dry erase performance.

Example 2

A two-component polyurethane composition was prepared as in Example 1 except the first reaction component was prepared by mixing 15.8 grams of C-1090 polyol, 0.3 grams of MCR-12, and 0.01 grams of DBTDL, with 28.3 grams of diacetone alcohol in a round bottom flask. The second reaction component consisted of 6.12 grams of TOLONATE HDT-LV in 38.2 grams of diacetone alcohol. The first and second reaction components were mixed in a one to one volume ratio at room temperature for 5 minutes and then poured onto SPF6 substrate and drawn done by hand with a conventional #12 Mayer bar to produce a coating of approximately 30 microns (0.0012 in) thickness. The coated film was cured for 1 hour at 120° C. in a convection oven. The resulting coating exhibited excellent bead up of the SHARPIE marker ink and excellent dry erase performance.

Comparative Example C1

A two-component polyurethane composition was prepared as in Example 1 except 50.25 grams of H12MDI, 31.25 grams of FOMREZ 44-111, 1.5 grams of MCR-CR12, and 0.01 grams of DBTDL, were mixed together in a round bottom flask and heated to 70° C. for one hour. 50 grams of dimethylformamide (DMF) and 13.6 grams of 1,4-butanediol were then added to the flask and the reaction was allowed to continue for two additional hours. 1.4 grams of TINUVIN 292, 2.0 grams of TINUVIN 571 and 300 grams of DMF were then added to the flask. After 20 minutes the flask was cooled to 20° C. to obtain a 25% solids polydimethylsiloxane (PDMS) terminated thermoplastic polyurethane (TPU) in DMF. The polyurethane composition then poured onto an SPF6 substrate and drawn done by hand with a conventional #12 Mayer bar to produce a coating of approximately 30 microns (0.0012 in) thickness. The coated film was cured for 1 hour at 80° C. in a convection oven. The resulting coating did not exhibit bead up of the SHARPIE marker ink and did not exhibit dry erase performance.

Comparative Example C2

A two-component polyurethane composition was prepared as in Example 1 except the first reaction component consisted of 8.4 grams of FOMREZ 55-112, 8.4 grams of FOMREZ 55-225, 8.4 grams of CAPA 3031, 1.8 grams of TINUVIN 405, and 1.3 grams of TINUVIN 292 mixed with 12 grams of propyleneglycol monomethylether acetate, 14 grams butylacetate, 25.3 grams xylene, and 1.83 grams of CAB 381-01 in a round bottom flask and mixed for an hour at room temperature. The second reaction component (30.3 grams of DESMODUR N3390) was then added to the flask and mixed for 5 minutes at room temperature. After the mixture was thoroughly mixed, the polyurethane composition was then poured onto an SPF6 substrate and drawn done by hand with a conventional #12 Mayer bar to produce a coating of approximately 30 microns (0.0012 in) thickness. The coated film was cured for 2 minutes at 80° C. and 10 minutes at 110° C. in a convection oven. The resulting coating did not exhibit bead up of the SHARPIE marker ink and did not exhibit dry erase performance.

Example 3

A two-component polyurethane composition was prepared as in Comparative Example C2 except 1.0 grams of TEGO 5001 was added to the first reaction component. The resulting coating exhibited excellent bead up of the SHARPIE marker ink and excellent dry erase performance.

Example 4

A two-component polyurethane composition was prepared as in Example 3 except 2.0 grams of TEGO 5001 was added to the first reaction component. The resulting coating exhibited excellent bead up of the SHARPIE marker ink and excellent dry erase performance.

Example 5

A two-component polyurethane composition was prepared as in Example 3 except 3.0 grams of TEGO 5001 was added to the first reaction component. The resulting coating exhibited excellent bead up of the SHARPIE marker ink and excellent dry erase performance.

Example 6

A two-component polyurethane composition was prepared as in Example 3 except 5.0 grams of TEGO 5001 was added to the first reaction component. The resulting coating exhibited excellent bead up of the SHARPIE marker ink and excellent dry erase performance.

Example 7

A two-component polyurethane composition was prepared as in Example 3 except 8.0 grams of TEGO 5001 was added to the first reaction component. The resulting coating exhibited excellent bead up of the SHARPIE marker ink and excellent dry erase performance.

Example 8

A two-component polyurethane composition was prepared as in Example 3 except 14.0 grams of TEGO 5001 was added to the first reaction component. The resulting coating exhibited excellent bead up of the SHARPIE marker ink and excellent dry erase performance.

Example 9

A two-component polyurethane composition was prepared as in Comparative Example C2 except the first reaction component consisted of 99.15 grams of the polyurethane clear coat solution described in Table 1 mixed with 0.85 grams of TEGO-5001 in a round bottom flask and then thoroughly mixed for 10 minutes at room temperature. The second reaction component consisted of 17.1 grams of DESMODUR N3390. The first and second reaction components were mixed in a 100/17.1 by weight ratio. The polyurethane composition was then poured onto an SPF6 substrate and drawn done by hand with a conventional #12 Mayer bar to produce a coating of approximately 30 microns (0.0012 in) thickness. The coated film was cured for 2 minutes at 80° C. and 10 minutes at 110° C. in a convection oven. The resulting coating exhibited excellent bead up of the SHARPIE marker ink and excellent dry erase performance.

Example 10

A two-component polyurethane composition was prepared as in Example 9 except the first reaction component consisted of 98.3 grams of the polyurethane clear coat solution described in Table 1 mixed with 1.7 grams of TEGO-5001. The polyurethane composition was then poured onto an SPF6 substrate and drawn done by hand with a conventional #12 Mayer bar to produce a coating of approximately 30 microns (0.0012 in) thickness. The resulting coating exhibited excellent bead up of the SHARPIE marker ink and excellent dry erase performance.

Example 11

A two-component polyurethane composition was prepared as in Example 9 except the first reaction component consisted of 97.45 grams of the polyurethane clear coat solution described in Table 1 mixed with 2.55 grams of TEGO-5001. The polyurethane composition was then poured onto an SPF6 substrate and drawn done by hand with a conventional #12 Mayer bar to produce a coating of approximately 30 microns (0.0012 in) thickness. The resulting coating exhibited excellent bead up of the SHARPIE marker ink and excellent dry erase performance.

Comparative Example C3

A two-component polyurethane composition was prepared as in Example 9 except the first reaction component consisted of 99.15 grams of the polyurethane clear coat solution described in Table 1 mixed with 0.85 grams of TEGO-5001. The second reaction component consisted of 27.95 grams of DESMODUR Z4470 (a secondary aliphatic polyisocyanate) and was added to the first reaction component in place of DESMODUR N3390. The first and second reaction components were mixed for 5 minutes at room temperature. The resulting coating did not exhibit bead up of the SHARPIE marker ink and did not exhibit dry erase performance.

Comparative Example C4

A two-component polyurethane composition was prepared as in Comparative Example C3 except 1.7 grams of TEGO 5001 was added to the first reaction component. The second reaction component consisted of 27.95 grams of DESMODUR Z4470 and was added to the first reaction component in place of DESMODUR N3390. The first and second reaction components were mixed for 5 minutes at room temperature. The resulting coating did not exhibit bead up of the SHARPIE marker ink and did not exhibit dry erase performance.

Comparative Example C5

A two-component polyurethane composition was prepared as in Comparative Example C3 except 2.55 grams of TEGO 5001 were added to the first reaction component. The second reaction component consisted of 27.95 grams of DESMODUR Z4470 and was added to the first reaction component in place of DESMODUR N3390. The first and second reaction components were mixed for 5 minutes at room temperature. The resulting coating did not exhibit bead up of the SHARPIE marker ink and did not exhibit dry erase performance.

Comparative Example C6

A two-component polyurethane was prepared as in Example 3 except 0.30 grams of TEGO 5000 was added to the first reaction component. The resulting coating was cloudy in appearance, tacky to the touch and did not exhibit bead up of the SHARPIE marker ink and did not exhibit dry erase performance.

Comparative Example C7

A two-component polyurethane composition was prepared as in Example 3 except 0.60 grams of TEGO 5000 was added to the first reaction component. The resulting coating was cloudy in appearance, tacky to the touch and did not exhibit bead up of the SHARPIE marker ink and did not exhibit dry erase performance.

Comparative Example C8

A two-component polyurethane was prepared as in Example 3 except 0.91 grams of TEGO 5000 was added to the first reaction component. The resulting coating was cloudy in appearance, tacky to the touch and did not exhibit bead up of the SHARPIE marker ink and did not exhibit dry erase performance.

Comparative Example C9

A commercially available urethane protection film (XPEL Ultimate film from XPEL Technologies, Corp, San Antonio, Tex., USA) was evaluated and did not exhibit bead up of the SHARPIE marker ink and did not exhibit dry erase performance.

Comparative Example C10

A commercially available urethane paint protection film (PPF C SunTek, Martinsville, Va. USA) was evaluated and did not exhibit bead up of the SHARPIE marker ink and did not exhibit dry erase performance.

Comparative Example C11

A commercially available urethane paint protection film (DEFENZALL, Haartz Corp, Acton, Mass., USA) was evaluated and did not exhibit bead up of the SHARPIE marker ink and did not exhibit dry erase performance

TABLE 2

Stain resistance (Color change - $\Delta E$, $\Delta L$, $\Delta a$, $\Delta b$)

|  | Bitumen | ATF1 | Road Tar | ATF2 |
|---|---|---|---|---|
| Comparative Example C2 | $\Delta E = 0.90$<br>$\Delta L = -0.06$<br>$\Delta a = -0.21$<br>$\Delta b = 0.88$ | $\Delta E = 0.27$<br>$\Delta L = -0.02$<br>$\Delta a = -0.22$<br>$\Delta b = 0.16$ | $\Delta E = 0.75$<br>$\Delta L = -0.06$<br>$\Delta a = -0.18$<br>$\Delta b = 0.73$ | $\Delta E = 0.24$<br>$\Delta L = -0.01$<br>$\Delta a = 0.19$<br>$\Delta b = 0.14$ |
| Example 3 | $\Delta E = 1.39$<br>$\Delta L = -0.16$<br>$\Delta a = -0.42$<br>$\Delta b = 1.32$ | $\Delta E = 0.41$<br>$\Delta L = -0.27$<br>$\Delta a = 0.16$<br>$\Delta b = 0.27$ | $\Delta E = 1.14$<br>$\Delta L = -0.25$<br>$\Delta a = -0.32$<br>$\Delta b = 1.06$ | $\Delta E = 0.48$<br>$\Delta L = -0.35$<br>$\Delta a = 0.25$<br>$\Delta b = 0.22$ |
| Example 4 | $\Delta E = 1.24$<br>$\Delta L = -0.20$<br>$\Delta a = -0.36$<br>$\Delta b = 1.17$ | $\Delta E = 0.41$<br>$\Delta L = -0.24$<br>$\Delta a = 0.14$<br>$\Delta b = 0.30$ | $\Delta E = 0.95$<br>$\Delta L = -0.17$<br>$\Delta a = -0.33$<br>$\Delta b = 0.87$ | $\Delta E = 0.42$<br>$\Delta L = -0.28$<br>$\Delta a = 0.18$<br>$\Delta b = 0.26$ |
| Example 5 | $\Delta E = 0.50$<br>$\Delta L = -0.44$<br>$\Delta a = 0.23$<br>$\Delta b = 0.01$ | $\Delta E = 1.15$<br>$\Delta L = -0.21$<br>$\Delta a = -0.33$<br>$\Delta b = 1.08$ | $\Delta E = 0.42$<br>$\Delta L = -0.34$<br>$\Delta a = -0.25$<br>$\Delta b = -0.01$ | $\Delta E = 0.96$<br>$\Delta L = -0.15$<br>$\Delta a = -0.28$<br>$\Delta b = 0.90$ |
| Example 6 | $\Delta E = 0.30$<br>$\Delta L = -0.19$<br>$\Delta a = 0.23$<br>$\Delta b = 0.07$ | $\Delta E = 1.32$<br>$\Delta L = -0.31$<br>$\Delta a = -0.37$<br>$\Delta b = 1.23$ | $\Delta E = 0.47$<br>$\Delta L = -0.30$<br>$\Delta a = -0.35$<br>$\Delta b = 0.03$ | $\Delta E = 1.08$<br>$\Delta L = -0.35$<br>$\Delta a = -0.34$<br>$\Delta b = 0.97$ |
| Example 7 | $\Delta E = 0.38$<br>$\Delta L = -0.23$<br>$\Delta a = 0.30$<br>$\Delta b = 0.04$ | $\Delta E = 1.58$<br>$\Delta L = -0.44$<br>$\Delta a = -0.52$<br>$\Delta b = 1.42$ | $\Delta E = 0.47$<br>$\Delta L = -0.37$<br>$\Delta a = -0.30$<br>$\Delta b = -0.05$ | $\Delta E = 1.31$<br>$\Delta L = -0.61$<br>$\Delta a = -0.40$<br>$\Delta b = 1.09$ |
| Example 8 | $\Delta E = 0.54$<br>$\Delta L = -0.38$<br>$\Delta a = 0.34$<br>$\Delta b = 0.17$ | $\Delta E = 1.82$<br>$\Delta L = -0.51$<br>$\Delta a = -0.51$<br>$\Delta b = 1.67$ | $\Delta E = 0.55$<br>$\Delta L = -0.42$<br>$\Delta a = -0.36$<br>$\Delta b = 0.07$ | $\Delta E = 1.41$<br>$\Delta L = -0.46$<br>$\Delta a = -0.41$<br>$\Delta b = 1.27$ |
| Comparative Example C9 | $\Delta E = 2.10$<br>$\Delta L = -0.54$<br>$\Delta a = -0.47$<br>$\Delta b = 1.98$ | $\Delta E = 0.52$<br>$\Delta L = -0.41$<br>$\Delta a = 0.16$<br>$\Delta b = 0.29$ | $\Delta E = 1.74$<br>$\Delta L = -0.33$<br>$\Delta a = -0.36$<br>$\Delta b = -1.67$ | $\Delta E = 0.51$<br>$\Delta L = -0.27$<br>$\Delta a = 0.33$<br>$\Delta b = 0.27$ |
| Comparative Example C10 | $\Delta E = 1.25$<br>$\Delta L = -0.38$<br>$\Delta a = -0.15$<br>$\Delta b = 1.18$ | $\Delta E = 0.24$<br>$\Delta L = 0.04$<br>$\Delta a = -0.01$<br>$\Delta b = 0.23$ | $\Delta E = 1.25$<br>$\Delta L = -0.43$<br>$\Delta a = -0.11$<br>$\Delta b = 1.17$ | $\Delta E = 1.50$<br>$\Delta L = -0.86$<br>$\Delta a = 0.91$<br>$\Delta b = 0.82$ |
| Comparative Example C11 | $\Delta E = 2.93$<br>$\Delta L = -0.34$<br>$\Delta a = -0.84$<br>$\Delta b = 2.79$ | $\Delta E = 1.05$<br>$\Delta L = -0.71$<br>$\Delta a = 0.51$<br>$\Delta b = 0.59$ | $\Delta E = 2.88$<br>$\Delta L = -0.36$<br>$\Delta a = -0.72$<br>$\Delta b = 2.76$ | $\Delta E = 2.21$<br>$\Delta L = -1.11$<br>$\Delta a = 1.81$<br>$\Delta b = 0.58$ |

TABLE 3

Haze and contact angle measurements

|  | Haze | Water Advancing Contact Angle | Water Receding Contact Angle |
|---|---|---|---|
| Comparative Example C2 | 1.55 | 93.1° | 76.2° |
| Example 3 | 2.62 | 105.2° | 83.8° |
| Example 4 | 2.06 | 105.9° | 85.4° |
| Example 5 | 4.06 | 107.9° | 85.9° |
| Example 6 | 7.02 | 108.2° | 86.8° |
| Example 7 | 12.60 | 109.8° | 85.1° |
| Example 8 | 9.65 | 109.4° | 88.8° |
| Comparative Example C9 | 2.90 | 82.5° | 36.4° |
| Comparative Example C10 | 1.94 | 81.2° | 33.3° |
| Comparative Example C4 | 1.87 | 79.1 | 29.3° |

All patents and patent applications mentioned above are hereby expressly incorporated by reference. Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the following claims and their equivalents.

The invention claimed is:

1. A hardenable composition comprising:
   a primary polyisocyanate;
   a monohydroxyl acrylic polydimethylsiloxane present in an amount ranging from 0.1 weight percent to 5.0 weight percent, relative to the overall weight of the hardenable composition; and
   a polyol selected from the group consisting of: a caprolactone polyol, polycarbonate polyol, a polyester polyol, acrylic polyol, polyether polyol, polyolefin polyol, and mixtures thereof.

2. The hardenable composition of claim 1, wherein the hardenable composition is a two-part hardenable composition comprising:

a first part comprising the polyisocyanate; and
a second part comprising a mixture of the polyol and the monohydroxyl acrylic polydimethylsiloxane.

3. The hardenable composition of claim 2, wherein the first part further comprises a catalyst selected from a tin catalyst, zinc catalyst, bismuth catalyst, zirconium catalyst, aluminum catalyst, amine catalyst, and mixtures thereof.

4. An article comprising a substrate coated with the hardenable composition of claim 1.

5. A hardenable composition comprising:
a primary polyisocyanate;
a monohydroxyl acrylic polydimethylsiloxane; and
a polyol selected from the group consisting of: a caprolactone polyol, polycarbonate polyol, acrylic polyol, polyolefin polyol, and mixtures thereof.

6. The hardenable composition of claim 5, wherein the monohydroxyl acrylic polydimethylsiloxane is present in an amount ranging from 0.1 weight percent to 5.0 weight percent, relative to the overall weight of the hardenable composition.

7. A composite film comprising:
a base layer; and
a transparent clear coat layer extending across the base layer, the clear coat layer comprising:
a primary polyisocyanate;
a monohydroxyl acrylic polydimethylsiloxane; and
a polyol selected from the group consisting of: caprolactone polyols, polycarbonate polyols, a polyester polyols, acrylic polyols, polyether polyols, polyolefin polyols, and mixtures thereof.

8. The composite film of claim 7, wherein the base layer comprises an aliphatic thermoplastic urethane.

9. The composite film of claim 7, wherein the base layer comprises polyvinylchloride.

10. The composite film of claim 7, wherein clear coat layer has an exposed top surface and a bottom surface contacting the base layer.

11. The composite film of claim 7, further comprising an adhesive layer extending across and contacting the base layer, wherein the base layer is interposed between the clear coat layer and the adhesive layer.

12. The composite film of claim 11, wherein the adhesive layer comprises a hot melt adhesive.

13. The composite film of claim 11, further comprising a clear coat liner extending across and contacting the clear coat layer, wherein the clear coat layer is interposed between the base layer and the clear coat liner.

14. A method of making a stain-resistant composite film comprising:
providing a clear coat layer by reacting together:
a primary polyisocyanate;
a monohydroxyl acrylic polydimethylsiloxane; and
a polyol;
coating the clear coat layer onto a base layer; and
providing a free surface on the clear coat layer during the reaction for a time interval sufficient to allow polydimethylsiloxane functional groups to migrate to the free surface, thereby imparting stain-resistant properties to the composite film.

15. The method of claim 14, wherein the polyol is selected from the group consisting of: caprolactone polyols, polycarbonate polyols, a polyester polyols, acrylic polyols, polyether polyols, polyolefin polyols, and mixtures thereof.

16. A composite film comprising:
a base layer; and
a transparent clear coat layer extending across the base layer, the clear coat layer comprising:
a primary polyisocyanate;
a monohydroxyl polydimethylsiloxane; and
a polyol selected from the group consisting of: caprolactone polyols, polycarbonate polyols, a polyester polyols, acrylic polyols, polyether polyols, polyolefin polyols, and mixtures thereof,
wherein the base layer comprises an aliphatic thermoplastic urethane or polyvinylchloride.

17. The composite film of claim 16, further comprising an adhesive layer extending across and contacting the base layer, wherein the base layer is interposed between the clear coat layer and the adhesive layer.

18. The composite film of claim 17, wherein the adhesive layer comprises a hot melt adhesive.

19. The composite film of claim 17, further comprising a clear coat liner extending across and contacting the clear coat layer, wherein the clear coat layer is interposed between the base layer and the clear coat liner.

* * * * *